United States Patent [19]

Nishimura

[11] 4,252,551
[45] Feb. 24, 1981

[54] METHOD OF CONTINUOUSLY PREPARING MOLTEN GLASS UTILIZING WASTE GLASS AS PART OF INGREDIENTS

[75] Inventor: Hiroaki Nishimura, Matsuzaka, Japan

[73] Assignee: Central Glass Company, Limited, Japan

[21] Appl. No.: 64,509

[22] Filed: Aug. 7, 1979

[30] Foreign Application Priority Data

Aug. 8, 1978 [JP] Japan .................................. 53-95810
Aug. 8, 1978 [JP] Japan ................................ 53-108022

[51] Int. Cl.³ .............................................. C03B 5/16
[52] U.S. Cl. ........................................... 65/28; 65/18; 65/27; 65/134
[58] Field of Search .................... 65/27, 18, 28, 134, 65/335

[56] References Cited

U.S. PATENT DOCUMENTS

| 4,054,434 | 10/1977 | Thomas et al. | 65/134 X |
| 4,145,202 | 3/1979 | Grodin et al. | 65/27 X |

FOREIGN PATENT DOCUMENTS

| 1254297 | 12/1964 | Fed. Rep. of Germany | 65/134 |
| 667474 | 3/1952 | United Kingdom . | |
| 1055773 | 1/1967 | United Kingdom . | |
| 1391297 | 4/1975 | United Kingdom . | |

Primary Examiner—Arthur D. Kellogg
Attorney, Agent, or Firm—Fleit & Jacobson

[57] ABSTRACT

A method of preparing molten glass in a melting tank of the continuous type by utilizing, as part of the ingredients, waste glass which may be either pulverized cullet of chopped glass fiber and may comprise an organic substance detrimental to the color or other properties of the molten glass. The waste glass and other raw materials are fed to molten glass in the tank continuously but separately such that the waste glass is remelted without contacting the unmelted raw materials and that remelting of the waste glass is preceded by burning of any organic substance possibly adhered to the waste glass fed to the tank and dissipation of the resultant combustion gas.

7 Claims, 5 Drawing Figures

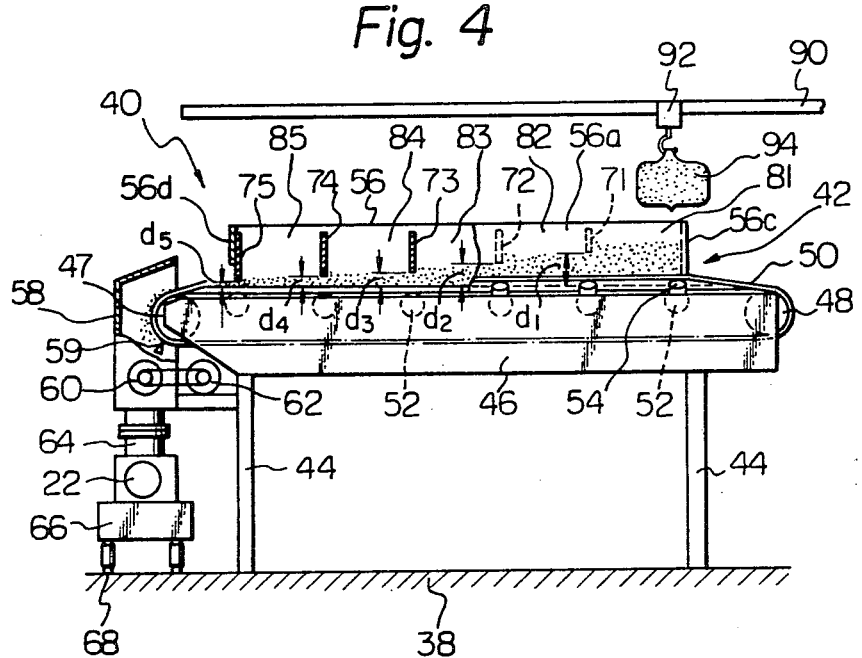
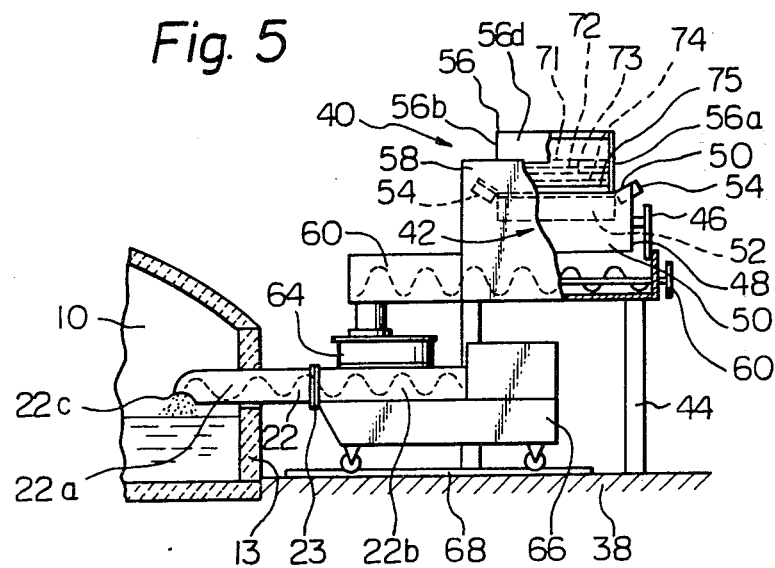

METHOD OF CONTINUOUSLY PREPARING MOLTEN GLASS UTILIZING WASTE GLASS AS PART OF INGREDIENTS

BACKGROUND OF THE INVENTION

This invention relates to a glass production method, and more particularly to a method of preparing molten glass as an indispensable step in the production of glass by utilizing waste glass as part of the ingredients.

In the production of glass and particularly of plate glass, it is usual to utilize pulverized waste glass as part of the starting materials. Besides an economical effect, remelting of waste glass aids in melting of other raw materials. In the case of using cullet or ordinary plate glass there is little problem so long as the amount of the reused cullet is not so large as unfaborably affects the quality or properties of the product. It is possible to reuse pulverized cullet of plate glass by premixing it with other raw materials and throwing the mixture onto the surface of molten glass in a furnace or tank.

Reuse of waste glass is made also in the production of glass bottles. In this case, however, there is an inconvenience that if an organic substance such as synthetic resin used as reinforcing coating on glass bottles remains adhered to the waste glass there occurs coloring of the produced glass in a brownish color as is commonly called carbon amber. Accordingly, there is the need of sorting recovered waste glass to avoid the reuse of scrap glass contaminated with an organic substance. A similar inconvenience is experienced also in the production of glass fiber. A large amount of industrially produced glass fiber is utilized in the form of mat or felt comprising an organic binder. If waste glass fiber contaminated with an organic binder is remelted together with other raw materials of glass fiber, the resultant molten glass tends to be colored irregularly and, furthermore, tends to become nonuniform in viscosity and/or involve bubbles, so that difficulties are offered to the succeeding spinning operation.

Furthermore, there is another problem about reuse of waste glass fiber. When waste glass fiber is put into the melting tank together with a mixture of other raw materials of glass, meaning that the reused glass fiber and the raw materials undergo melting in a mixed state, remelting of the glass fiber proceeds so rapidly because of its thinness in diameter that melting of the raw materials through a vitrification reaction is obstructed by the remelted glass. As a consequence there arises a possibility that the presence of unmelted raw materials in the molten glass causes errosion of platinum parts such as bushings formed with spinning orifices, even aside from the aforementioned unfavorable phenomena attributed to the presence of an organic substance in the reused waste glass fiber.

For these reasons, it has been deemed impractical to industrially reuse waste glass fiber, and therefore waste glass fiber has mostly been dumped.

SUMMARY OF THE INVENTION

It is an object of the present invention to provide a method of continuously preparing molten glass by utilizing waste glass which may be either pulverized cullet or chopped glass fiber and may comprise an organic substance detrimental to the color or other properties of the molten glass, which method can easily be put into industrial practice and gives molten glass of good quality irrespective of the kind and form of the reused waste glass.

According to the invention, molten glass is prepared in a melting tank of the continuous type of continuously feeding a mixture of pulverized raw materials of glass to molten glass present in a melting zone of the tank, continuously feeding finely divided waste glass, which may comprise an organic substance, to the molten glass in the melting zone of the tank separately from feeding of the raw materials such that the waste glass fed into the melting zone is remelted without contacting the raw materials in unmelted state, and burning any organic substance comprised in the waste glass fed into the melting zone and dissipating the resultant combustion gas before remelting of the waste glass.

Separate feeding of waste glass and other raw materials to the molten glass in the melting zone can be accomplished by using two independent feed means such as two sets of screw conveyers which are positioned at an appropriate distance therebetween.

Burning or oxidation decomposition of any organic substance possibly adhered to the waste glass fed into the tank can be achieved by maintaining a high temperature oxidizing atmosphere in a region where the waste glass is fed into the tank. Such a high temperature oxidizing atmosphere can easily be maintained by supplying an air-fuel mixture containing excess air to a portion of burner nozzles provided to the melting tank.

Of course the proportion of the waste glass to the other raw materials is determined such that the composition of the obtained molten glass falls within a permissible range. Whether pulverized cullet or chopped glass fiber, it is preferable that the waste glass to be remelted is in a very finely divided form.

Since any organic substance comprised in the waste glass is burned and dissipated before remelting of the waste glass, even the use of waste glass contaminated by an organic substance does not influence the color or other properties of the obtained molten glass. Since the waste glass and the other raw materials are fed to the tank separately so as to undergo melting in separate regions, the burning of the organic substance can be accomplished without significantly affecting the unmelted raw materials, and rapid remelting of the waste glass does not disturb melting of the raw materials. Therefore, the invention makes it industrially practicable to reuse waste glass contaminated with an organic substance or reuse waste glass fiber whether it is contaminated with any organic substance or not.

In the case of reusing waste glass fiber, it has not been so easy to continuously feed waste glass fiber into the melting tank at a constant feed rate. However, the invention provides also a unique and simple method for continuous and constant-rate feeding of chopped glass fiber as will be described hereinafter.

BRIEF DESCRIPTION OF THE DRAWINGS

FIG. 4 is a side view, partly in section, of a glass fiber feed mechanism useful for a method according to the invention; and FIG. 5 is a front view, partly in section, of the same feed mechanism.

DESCRIPTION OF THE PREFERRED EMBODIMENTS

Figure 1:
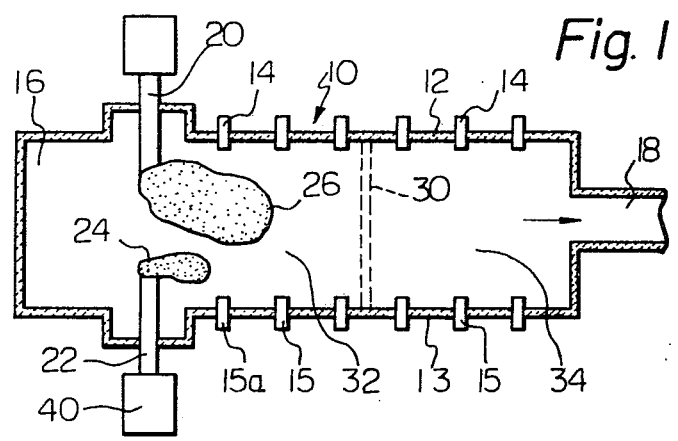
FIG. 1 is a schematic plan view of a glass melting tank used in a method according to the invention.
Figure 2:
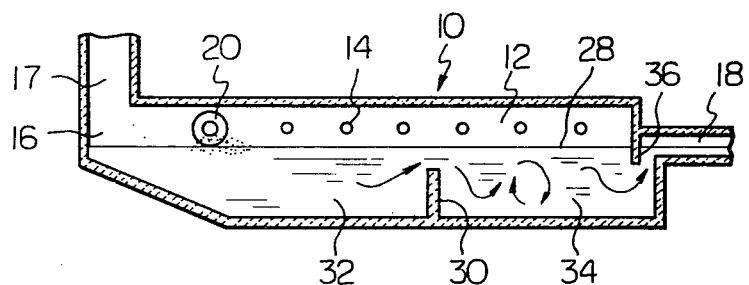
FIG. 2 is a schematic and sectional side view of the same tank.

Referring to FIGS. 1 and 2, the invention relates to melting of the ingredients of glass (the type of which is not particularly limited) in a furnace 10 of the type commonly called continuous tank. Two side walls 12 and 13 of this melting tank 10 are provided with a multiplicity of burner nozzles 14 and 15 which inject a mixture of heavy oil and air towards the opposite wall 12 or 13. At one end 16 of the tank 10 communicates with a flue 17, and at the other end there is a discharge port 18 for continuous discharge of molten glass from the tank 10 into a working zone (not shown). Functionally the tank 10 is divided into two zones, namely, a melting zone 32 closer to the aforementioned end 16 and a fining zone 34 closer to the discharge port 18, by a weir wall 30 built on the bottom of the tank 10. The upper edge of this wall 30 is below the level 28 of the molten glass in the tank 10. In the melting zone 32, a screw conveyer 20 intrudes into the tank 10 through an opening in the side wall 12 to feed a mixture of powdered raw materials which may include, for example, clay, limestone, dolomite, colemanite and/or fluorite to the melting zone 32. The forward end or outlet of the screw conveyer 20 is positioned at a short distance above the level 28 of the molten glass.

According to the invention, another screw conveyer 22 is provided to the tank 10 so as to intrude into the melting zone 32 through an opening in the side wall 13, and waste glass employed as part of the ingredients of the glass is fed to the tank 10 exclusively by this screw conveyer 22. In other words, the mixture of raw materials fed to the tank 10 by the first screw conveyer 20 does not contain waste glass. The forward end or outlet of the second screw conveyer 22, too, is positioned at a short distance above the level 28 of the molten glass. It is important that the outlet of the second screw conveyer 22 is sufficiently distant from the outlet of the first screw conveyer 20 so that waste glass 24 supplied to the molten glass in the melting zone 32 may not come into contact with raw materials 26 supplied to the molten glass in the same zone 32 before melting of the waste glass. Of course the feed rates of the raw materials and waste glass can be controlled by controlling the speeds of the respective conveyers 20 and 22, and the manner of distribution of the raw materials 26 or the waste glass 24 supplied to the molten glass in the melting zone 32 can be controlled by reciprocating the screw conveyer 20 or 22.

In the present invention, the waste glass may be either crushed cullet or chopped filaments of glass fiber, and it is permissible that the waste glass has been contaiminated with an organic substance. For example, the source of the waste glass may be glass bottles having a plastic coating for reinforcing purpose, sandwich glass comprising an intermediate plastic film or a glass fiber mat or felt produced by using a binder such as starch or vinyl acetate. To prevent contamination of the molten glass with such an organic substance, the raw materials and the waste glass are fed to the melting zone 32 separately and, besides, a high temperature and sufficiently oxidizing atmosphere is maintained in a region where accumulates the waste glass supplied to the molten glass so that the organic substance may completely be burned and dissipated in the form of combustion gas before melting of the waste glass. In the case of FIG. 1, a high temperature oxidizing atmosphere is maintained in a region where accumulates the waste glass 24 by adjusting the air/fuel ratio of an air-oil mixture supplied to a burner nozzle 15a, which is one closest to the second screw conveyer 22 among the burner nozzles 15 provided to the side wall 13, so as to contain considerably excess air. The combustion gas is discharged from the tank 10 through the flue 17.

It is preferable that the amount of the waste glass is less than about 50% by weight of the raw materials fed by the first screw conveyer 20 in the case of crushed cullet but less than about 20% by weight in the case of waste glass fiber. The use of a larger amount of waste glass is undesirable becuase in such a case there is a possibility that a portion of the waste glass melts before completion of combustion and dissipation of the organic substance adhered to the waste glass. In the case of the waste glass being fiber glass, a feed mechanism 40 is combined with the second screw conveyer 22 as will be described later.

As mentioned hereinbefore, melting of the waste glass 24 accumulated in the melting zone 32 proceeds more rapidly than melting of the raw materials 26 which melt through a vitrification reaction. However melting of the waste glass 24 does not disturb melting of the raw materials 26 because melting of the waste glass occurs in a region (24) distant from the unmelted raw materials 26.

The remelted waste glass mingles into the molten glass in the melting zone 32, and melting of the raw materials 26 too is completed within the melting zone 32. Then the molten glass flows over the weir wall 30 to enter the fining zone 34, where the molten glass makes a convectively up-and-down movement. Then the molten and fined glass is guided into the discharge port 18 by a weir wall 36 which extends downward from an upper structure of the tank 10 to a certain depth from the level 28 of the molten glass.

Thus, despite the use of a contaminated waste glass which may be glass fiber, molten glass of good quality can be prepared without consuming extra costs of fuel or extending time for completion of the melting process.

Figure 3:
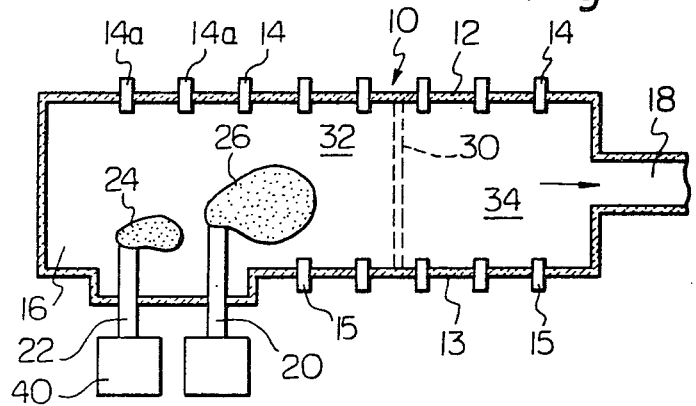
FIG. 3 is a schematic plan view of a slightly modified glass melting tank also used in a method of the invention.

FIG. 3 shows a modification of the positional relation between the two screw conveyers 20 and 22. In this case the first screw conveyer 20 for feeding of the raw materials and the second screw conveyer 22 for feeding of waste glass are provided in a parallel arrangement with a distance therebetween in the longitudinal direction of the tank 10. That is, both the two screw conveyers 20 and 22 intrude into the melting zone 32 through the same side wall 13, and the second screw conveyer 22 is located on the upstream side. The distance between the two conveyers 20 and 22 and, more importantly, the distance of the outlet end of the first conveyer 20 from that of the second conveyer 22 are determined such that in the melting zone 32 the waste glass 24 in unmelted state does not come into contact with the unmelted raw materials 26. In this case, an air-oil mixture containing excess air is supplied to burner nozzles 14a which are ones closest to the second converyer 22 among the burner nozzles 14 provided to the side wall 12. It will be apparent that the melting process including removal of the organic substance from the unmelted waste glass 24 proceeds in the same way as described with reference to FIGS. 1 and 2.

Where the waste glass to be thrown into the tank 10 as part of the raw materials is glass fiber recovered in the form of short filaments, it becomes a problem to continuously feed the waste glass fiber to the screw conveyer 22 at a constant feed rate. A heap of short glass filaments lacks fluidity and is liable to undergo changes in its bulk density, and furthermore the filaments are often entangled to form a number of lumps. Conventionally, therefore, a continuous and constant-rate feed or conveyance of short glass filaments can be accomplished on an industrial scale only by means of a very complicated mechanism which requires troublesome adjustment procedures before and during operation.

The present invention offers a solution also to this problem. More concretely, the invention proposes to accomplish a continuous and constant-rate feed of waste glass fiber in the form of short filaments to the tank 10 or to the conveyer 22 by means of a belt conveyer of a unique construction.

FIGS. 4 and 5 show a mechanism 40 according to the invention to continuously feed short glass filaments to the screw conveyer 22 which is provided to the tank 10 as described hereinbefore. A horizontally running belt conveyer 42 is constructed on a support frame 46 which is supported by pillars 44 standing on the floor 38. Fundamentally the belt conveyer 42 is made up of a head roller 47 which is driven by a motor (not shown) via a speed change gear mechanism (not shown), a tail-end roller 48, an endless belt 50 of rubber, a series of rollers 52 arranged horizontally at intervals between the head and tail-end rollers 47 and 48 and two series of inclined idler rollers 54 arranged to upwardly obliquely bend the side marginal regions of the belt 50 thereby to prevent the glass fibers from falling off the belt 50 during conveyance.

The screw conveyer 22 intruding into the tank 10 is arranged horizontally and mounted on a wheeled carrier 66 which can reciprocate on rails 68, and another screw conveyer 60 is arranged horizontally at a short distance above the screw conveyer 22 such that an outlet at the forward end of the conveyer 60 makes slide contact with the top of an inlet hopper 64 of the conveyer 22. Indicated at 62 is a motor to drive the screw conveyer 60. A hopper 58 is provided to this screw conveyer 60, and the forward end of the belt conveyer 42 intrudes into this hopper 58 so that the glass filaments discharged from the belt conveyer 42 fall on the screw conveyer 60 through this hopper 58. As illustrated, the hopper 58 has a hood (no numeral) to prevent scattering of glass filaments into the atmosphere. Indicated at 59 is a scraper located in the hopper 58 to scrape the coherent glass filaments off the belt 50. The screw conveyer 22 has a forward guide tube 22a which is detachably secured to a rear guide tube 22b by means of a coupling 23. The forward guide tube 22a is provided with a cooling water jacket (not shown) and intrudes into the tank 10 through an opening in the side wall 13. Since the rear guide tube 22b is mounted on the wheeled carrier 66, it is possible to vary the extent of intrusion of the forward guide tube 22a into the tank 10 and hence the distance of an outlet 22c at the forward end of the guide tube 22a from the side wall 13.

According to the invention, a rectangular trough-like frame 56 is held just above the belt 50 of the conveyer 42. Fundamentally, this frame 56 is constituted of two parallel side walls 56a and 56b of which length is close to the effective length of the belt converyer 42, a rear end wall 56c of which width is nearly equal to the effective width of the belt 50 and a front end wall 56d arranged parallel to the rear end wall 56c and located near the head roller 47, meaning that the frame 56 is open both at the top and at the bottom. The side walls 56a, 56b and the rear end wall 56c make a slide contact with the upside of the belt 50 at their lower edges, whereas the lower edge of the front end wall 56d is spaced from the belt 50 so as to provide an outlet to this frame 56. In this frame 56, there are a plurality of partition plates 71, 72, 73, 74 and 75 arranged parallel to the rear and front end walls 56c and 56d at intervals in the direction of the movement of the belt 50. The lower edges of the respective partition plates 71-75 are distant from the upside of the belt 50, and the distance of the lower edge of each partition plate from the belt 50 becomes gradually shorter as the distance of each partition plate from the rear end wall 56c becomes longer. In FIG. 4, the distance $d_1$ between the upside of the belt 50 and the lower edge of the partition plate 71, which is the one closest to the rear end wall 56c, is greater than the distance $d_2$ between the belt 50 and the lower edge of the next partition plate 72. The distance $d_3$ between the belt 50 and the next partition wall 73 is smaller than $d_2$, and the distance $d_4$ of the next partition plate 74 from the belt 50 is more smaller. The frontmost partition plate 75 is vertically slidably attached to the front end wall 56d such that the distance $d_5$ of the lower edge of this plate 75 from the belt 50 is adjustable within the limitation that $d_5$ does not become greater than $d_4$. Thus, the partition plates 71-75 divide the interior of the frame 54 into five section 81-85.

A rail 90 horizontally extends above the frame 56, and a hoist 92 to carry a waste glass fiber container 94 moves on this rail 90.

In advance of feeding to the belt conveyer 42, waste glass fiber is chopped such that most of the glass filaments have lengths falling within the range from about 10 mm to about 50 mm, and more preferably within the range from about 20 mm to about 30 mm.

The hoist 92 carries the container 94 containing the chopped glass fiber to a position above the rearmost section 81 of the interior of the frame 56. Then the container 94 opens its outlet at the bottom to allow the glass filaments to fall off the container 94 and heap on the belt 50 within the rearmost section 81 of the interior of the frame 56. In this section 81, the height of the glass fiber heap or thickness of the glass fiber layer on the belt 50 may be greater than the distance $d_1$ between the belt 50 and the lower edge of the partition plate 71.

As the belt 50 runs slowly, the glass fiber heaped in the rearmost section 81 of the interior of the frame 56 is carried into the next section 82 through the gap between the belt 50 and the lower edge of the partition plate 71. So long as the level of the glass fiber layer in the section 81 is above the lower edge of the partition plate 71, the partition plate 71 offers an obstruction to the path for an uppermost portion of the glass fiber layer in the section 81. In other words, the partition plate 71 serves as a sort of rake so that the glass fiber layer is leveled to a uniform thickness equal to the distance $d_1$ between the belt 50 and the partition plate 71 upon entrance of the glass fiber to the section 82. Similarly, the partition plate 72 forces the glass fiber layer to decrease its thickness from $d_1$ to $d_2$ upon entrance to the next section 83. As a consequence, the glass fiber passes through the frontmost section 85 of the interior of the frame 56 as a relatively thin layer ($d_4$ in thickness) and is fed into the hopper 58 through the gap between the belt 50 and the lower edge of the partition plate 75 at a constant feed rate which is ultimately determined by the distance $d_5$ between the belt 50 and the lower edge of the partition plate 75. Of course the feed rate can be controlled also by varying the speed of the belt conveyer 42.

Thus, a heap of short glass filaments on the running belt 50 is leveled to become a layer of uniform thickness, and then this layer is gradually reduced in thickness while travelling through the interior of the frame 56 solely by the effect of the partition plates 71-75 arranged in the frame 56 respectively at appropriate vertical distances from the belt 50. Accordingly this process on the belt conveyer 52 is accompanied by neither an appreciable change in bulk density of the glass fiber layer nor lumping of the short glass filaments, so that the short glass filaments can be fed continuously to the tank 10 via the screw conveyers 60 and 22 at a desirably predetermined constant feed rate. It is very advantageous that a continuous and constant-rate feed of waste glass fiber to the tank 10 can be achieved by intermittently feeding the waste glass fiber to the belt conveyer 42 with little care about the manner of the feed to the belt conveyer 42. As an additional advantage, the combination of the belt conveyer 42, frame 56 and partition plates 71-75 is low in the costs of equipment and maintenance.

It will be understood that the screw conveyer 60 may be replaced by a different type of conveyer or, according to the design of the inlet hopper 64 of the screw conveyer 22, may be omitted. Also it will be understood that the use of the above described feed mechanism is not limited to the feed or conveyance of waste glass fiber in the production of glass. For example, this mechanism may be used for continuous feeding of short filaments of a synthetic fiber or a rock wool in the production of a composite material comprising such a fibrous material and either a synthetic resin or cement.

What is claimed is:

1. A method of preparing molten glass in a melting tank of the continuous type, comprising the steps of:
   continuously feeding a mixture of powdered raw materials of glass to molten glass present in a melting zone of the tank;
   continuously feeding waste glass, which may comprise an organic substance detrimental to the color or other properties of the molten glass to be prepared, to said molten glass in said melting zone separately from the feeding of said raw materials such that the waste glass fed into said melting zone undergoes remelting without contacting the raw materials fed into said melting zone and yet unmelted; and
   burning any organic substance comprised in the waste glass fed into said melting zone by maintaining a high temperature oxidizing atmosphere in a region of said melting zone where the waste glass is fed into said melting zone and dissipating a resultant combustion gas before remelting of the waste glass fed into the melting zone.

2. A method according to claim 1, wherein said high temperature oxidizing atmosphere is maintained by supplying an air-fuel mixture containing excess air to at least one burner nozzle provided to the tank at a location close to said region.

3. A method according to claim 1, wherein said mixture of said raw materials is fed into said melting zone through an opening in a side wall of the tank, whereas said waste glass is fed into said melting zone through an opening in an opposite side wall of the tank.

4. A method according to claim 1, wherein said mixture of said raw materials is fed into said melting zone through a first opening in a side wall of the tank, whereas said waste glass is fed into said melting zone through a second opening in said side wall, said second opening being located upstream of said first opening with respect to the direction of flow of molten glass in the tank.

5. A method according to claim 1, wherein said waste glass is waste glass fiber and is fed into said melting zone at such a feed rate that the proportion of said waste glass fiber fed into said melting zone to said mixture of raw materials fed into said melting zone is not greater than about 20:100 by weight.

6. A method according to claim 5, wherein said waste glass fiber is in the form of short glass filaments having lengths in the range from about 10 mm to about 50 mm.

7. A method according to claim 6, wherein said waste glass fiber is continuously fed into said melting zone at a substantially constant feed rate by the steps of:
   providing a stationary frame having two parallel, vertical and laterally elongate side walls onto a belt conveyer such that said side walls laterally extend in the direction of the movement of the belt of said conveyer and that lower edges of said two side walls are in slide contact with the upside of said belt respectively in two side marginal regions of said belt, said frame being open both at the top and at the bottom thereof and having an opening at a front end located near the discharge end of said belt conveyer;
   providing a plurality of vertically standing partition plates into said frame at intervals in the direction of the movement of said belt so as to divide the interior of said frame into a plurality of generally rectangular sections, the lower edges of said partition plates being differently spaced from the upside of said belt such that the vertical distances between the upside of said belt and the lower edges of the respective partition plates become gradually smaller in the direction of the movement of said belt of said conveyer;
   putting a quantity of said waste glass fiber into the rearmost one of said plurality of sections of the interior of said frame and operating said belt conveyer, whereby said waste glass fiber becomes a thin layer of a uniform thickness while carried by said belt conveyer to pass through gaps between the upside of said belt and the lower edges of said partition plates; and
   continuously transferring said waste glass fiber discharged from said belt conveyer into said melting zone.

* * * * *